United States Patent [19]
Hulse et al.

[11] Patent Number: 6,139,176
[45] Date of Patent: Oct. 31, 2000

[54] OPTICAL WAVEGUIDE STRUCTURE WITH RAISED OR EMBEDDED WAVEGUIDES

[75] Inventors: George R. Hulse, Cookeville, Tenn.;
Ronald O. Woodward, Yorktown, Va.;
Joe P. Young, Sparta, Tenn.

[73] Assignee: Federal-Mogul World Wide, Inc., Southfield, Mich.

[21] Appl. No.: 09/206,306

[22] Filed: Dec. 7, 1998

Related U.S. Application Data

[63] Continuation of application No. 09/109,051, Jul. 2, 1998.
[51] Int. Cl.[7] .................................................. A61M 1/00
[52] U.S. Cl. .......................... 362/581; 362/30; 362/31; 362/551; 362/576; 362/277; 385/19; 385/901
[58] Field of Search .................................... 362/581, 551, 362/576, 31, 30, 32, 27, 277; 385/18, 19, 39, 901

[56] References Cited

U.S. PATENT DOCUMENTS

| | | |
|---|---|---|
| Re. 33,722 | 10/1991 | Scifres et al. . |
| 3,832,028 | 8/1974 | Kapron . |
| 3,901,581 | 8/1975 | Thiel . |
| 4,151,582 | 4/1979 | Grunberger . |
| 4,432,039 | 2/1984 | Cibie . |
| 4,714,983 | 12/1987 | Lang ........................................ 362/27 |
| 4,767,172 | 8/1988 | Nichols et al. . |
| 4,824,194 | 4/1989 | Karasawa . |
| 4,883,333 | 11/1989 | Yanez . |
| 4,885,663 | 12/1989 | Parker . |
| 4,907,132 | 3/1990 | Parker . |
| 5,005,108 | 4/1991 | Pristash et al. . |
| 5,042,892 | 8/1991 | Chiu et al. . |
| 5,136,480 | 8/1992 | Pristash et al. . |
| 5,199,091 | 3/1993 | Davenport et al. . |
| 5,343,367 | 8/1994 | Davenport et al. . |
| 5,410,454 | 4/1995 | Murase et al. . |
| 5,613,751 | 3/1997 | Parker et al. . |
| 5,618,096 | 4/1997 | Parker et al. . |
| 5,711,588 | 1/1998 | Rudisill .................................... 362/30 |
| 5,791,756 | 8/1998 | Hulse et al. . |
| 5,812,714 | 9/1998 | Hulse . |

OTHER PUBLICATIONS

Hulse et al., "Analysis of Waveguide Geometrics at Bends and Branches for the Directing of Light", Paper No. 98?????, pp. 1–6.

Hulse, "Focus–less Optics and Their Use in Automotive Distributed Lighting Systems", SAE Technical Paper Series 970252, SAE International, International Congress & Exposition, Detroit, Michigan, Feb. 24–27, 1997, pp. 1–5.

Hulse et al, "HID Driven Focus–less Optics System for Complete Automotive Distributed Lighting Systems", Paper No. 98?????, pp. 1–3.

Hulse et al., "Three Specific Design Issues Associated With Automotive Distributed Lighting Systems: Size, Efficiency, and Reliability", SAE Technical Paper Series 960492, SAE International, International Congress & Exposition, Detroit, Michigan, Feb.

Primary Examiner—Thong Nguyen
Assistant Examiner—Craig Curtis
Attorney, Agent, or Firm—Reising, Ethington, Barnes, Kisselle, Learman & McCulloch, P.C.

[57] ABSTRACT

An optical waveguide structure (1000) is configured to receive light from a light source (1020) and distribute the light to output ports. The structure includes a central portion having top and bottom surfaces, peripheral edges and an opening (1070) for receiving the light source (1020). A first waveguide (1010) extends above the top surface of the central portion. The first waveguide (1010) has an input face (1030) at an end nearest the opening (1070). The first waveguide (1010) extends from the opening (1070) toward a peripheral edge of the central portion.

24 Claims, 7 Drawing Sheets

OPTICAL WAVEGUIDE STRUCTURE WITH RAISED OR EMBEDDED WAVEGUIDES

CROSS REFERENCE TO RELATED APPLICATIONS

This application continuation of application Ser. No. 09/109,051, "OPTICAL WAVEGUIDE STRUCTURES," filed Jul. 2, 1998, which is incorporated by reference.

TECHNICAL FIELD

The invention relates to distributed lighting systems.

BACKGROUND OF THE INVENTION

Distributed lighting systems collect light from a central light source and distribute it to multiple output points. Non-distributed lighting systems generally require a light source at each output location. For example, a separate light bulb may be required for each internal light in a vehicle. Hence, non-distributed systems require a greater number of light sources. Such a configuration increases the cost of manufacture and installation, increases system complexity, and decreases system reliability.

SUMMARY OF THE INVENTION

An optical waveguide structure is configured to receive light from a light source and to distribute the light to output ports. The structure includes a central portion having top and bottom surfaces, peripheral edges, and an opening for receiving the light source. A first waveguide extends above the top surface of the central portion. The first waveguide has an input face at an end nearest the opening. The first waveguide extends from the opening toward a peripheral edge of the central portion.

A lighting component for distributing light from a light source includes a support structure made of a solid material and having top and bottom surfaces. An integral optical waveguide made of the solid material is on the top surface. The support structure is wider than the optical waveguide.

These waveguide structures collect light from a light source and distribute the light to various output points. The structures may be easily and inexpensively manufactured and installed. The structures allow a single light source to provide multiple lighting functions within, for example, the interior of a vehicle.

Other features and advantages will be apparent from the following detailed description, including the drawings, and from the claims.

DESCRIPTION OF PREFERRED EMBODIMENTS

Figures 1, 2:
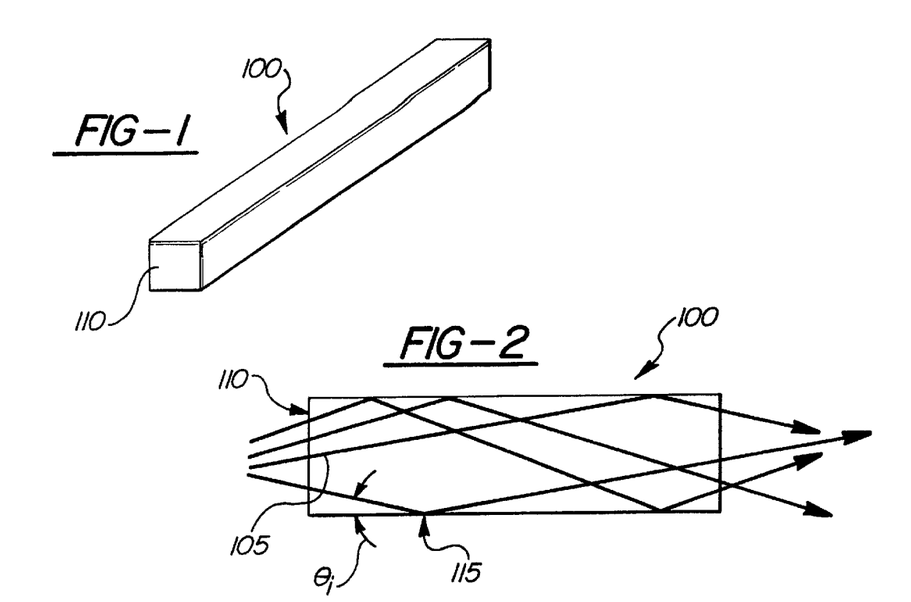
FIG. 1 is a perspective view of an optical waveguide.
FIG. 2 is a side view of the optical waveguide of FIG. 1.

An optical waveguide 100, as shown in FIG. 1, may be formed from optically transparent material such as acrylic or glass. If the waveguide is formed from acrylic or a similar material, it can be manufactured using an injection molding process. The manufacture of waveguide elements using injection molding results in very low manufacturing costs compared to fiber optics. In addition, molded acrylic waveguide elements are more rigid than fiber optics, can be installed by robots, and generally do not require maintenance. Waveguide elements can also achieve much smaller bend radii than fiber.

As shown in FIG. 2, a light ray 105 entering the input face 110 proceeds through the waveguide 100 until the light ray 105 reaches an outer surface 115 of the waveguide 100, i.e. an interface between the material of the waveguide 100 and air. At the outer surface 115, light is reflected in accordance with Snell's law. If the angle of incidence ($\theta_i$) of the light ray 105 at the outer surface 115 is less than a threshold referred to as the critical angle ($\theta_c$), then the light ray 105 is reflected internally, with no light escaping. This phenomenon is known as total internal reflection (TIR). The critical angle depends on the index of refraction of the material of which the waveguide is composed relative to that of the material surrounding the waveguide, (e.g., air). For example, if the waveguide were made from acrylic, which has an index of refraction of approximately 1.5, and surrounded by air, the critical angle, $\theta_c$, would be:

$$\theta_c = \arcsin(n_a/n_b) = \arcsin(1/1.5) = 41.8°$$

where $n_a$ is the index of refraction of air (1.0) and $n_b$ is the index of refraction of acrylic (1.5).

Optical waveguides and other optical structures may be combined to form a distributed lighting system (DLS), which provides an integrated structure for collecting and distributing light from a light source.

For example, as discussed in further detail below, an optical waveguide structure is configured to receive light from a light source and distribute the light to output ports. The structure includes a central portion having top and bottom surfaces, peripheral edges and an opening for receiving the light source. A first waveguide extends above the top surface of the central portion. The first waveguide has an input face at an end nearest the opening. The first waveguide extends from the opening toward a peripheral edge of the central portion.

The first waveguide may extend below the bottom surface. The first waveguide and the central portion may be integrally formed as a single piece of material. The input face of the first waveguide may be orthogonal to a side of the first waveguide. The input face of the first waveguide may form a non-orthogonal angle with respect to a side of the second waveguide.

The optical waveguide structure may include a second waveguide extending above the top surface of the central portion. The second waveguide may have an input face at an end nearest the opening, and the second waveguide may extend from the opening toward a peripheral edge of the central portion.

Tabs may be positioned in an interior portion of the opening to attach the light source to the waveguide structure. A channel may be formed in the bottom surface beneath the first waveguide. The width of the channel may be narrower than the width of the first waveguide. The width of the channel may expand in a direction from the top surface to the bottom surface. The depth of the channel may be less than the thickness of the central portion.

A lighting component for distributing light from a light source includes a support structure made of a solid material and having top and bottom surfaces. An integral optical waveguide made of the solid material is on the top surface. The support structure is wider than the optical waveguide.

A channel may be formed in the bottom surface beneath the first waveguide. The width of the channel may be narrower than a width of the first waveguide. The depth of the channel may be less than the thickness of the central portion. The optical waveguide may have an upper surface that is roughened to output light. The optical waveguide may have a notch formed in an upper surface to output light. The optical waveguide may have a branch portion that connects a first section of the waveguide to a second section of the waveguide. The branch may have an upper surface that is roughened to output light. The first section of the optical waveguide may have a notch formed in a side surface of the waveguide to reflect light into the branch portion.

The embodiments may be understood through the following detailed discussion with reference to the figures.

Figure 3:
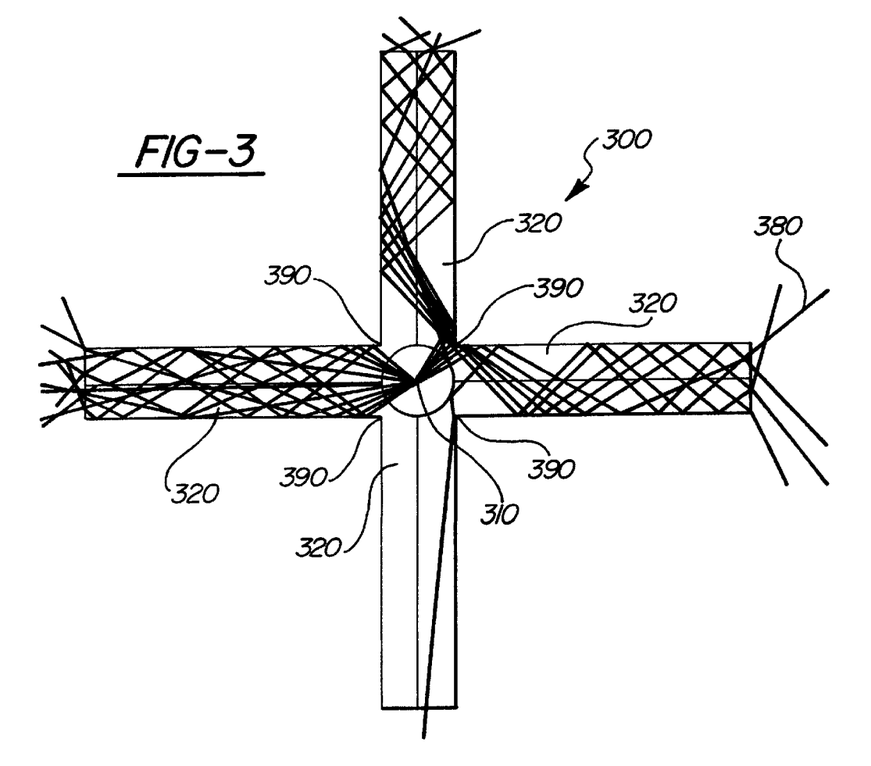
FIG. 3 is a light ray diagram for a four-arm waveguide structure.

As shown in FIG. 3, a four-arm waveguide structure 300 collects light from a light source 310 and divides the light among output arms 320 that extend from the light source 310. The arms lie in an azimuthal plane relative to the light source.

FIG. 3 also shows computed light ray 380 paths for the waveguide structure 300. For reasons of clarity, only a portion of the light rays 380 from the light source 310 are traced in the diagram. The waveguide structure collects light from the light source and divides it among the output arms 320. In this example, the vertices 390 are positioned relative to the light source 310 so that essentially all of the light collected is distributed into one of the output arms 320, i.e., light does not escape at the vertices 390.

Figure 4:
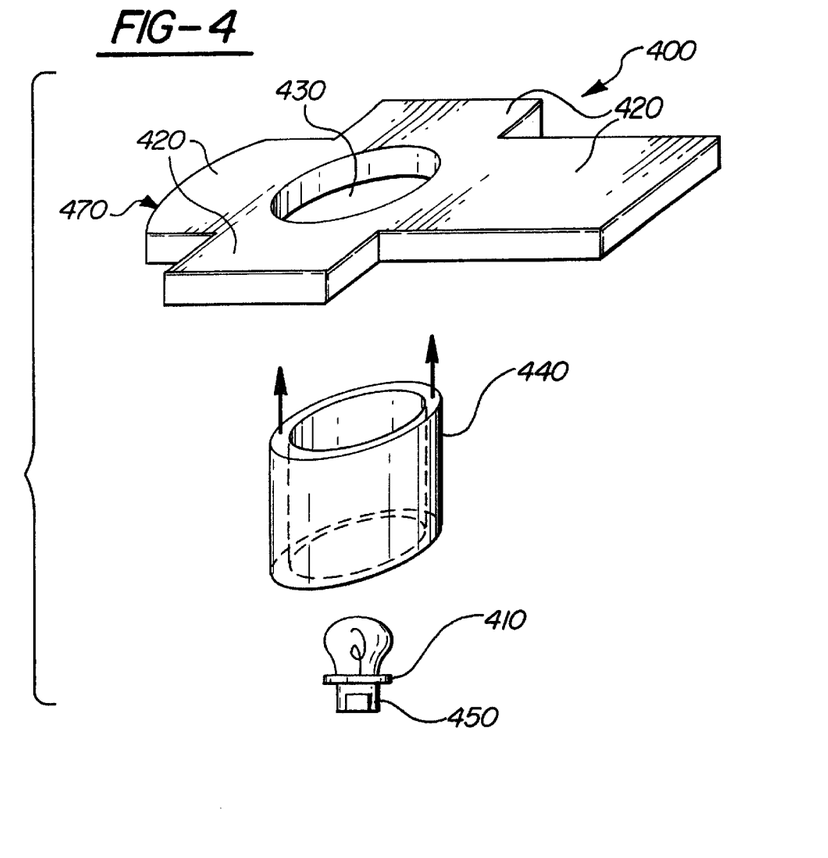
FIG. 4 is a perspective view of a planar, four-arm waveguide structure.
Figure 5:
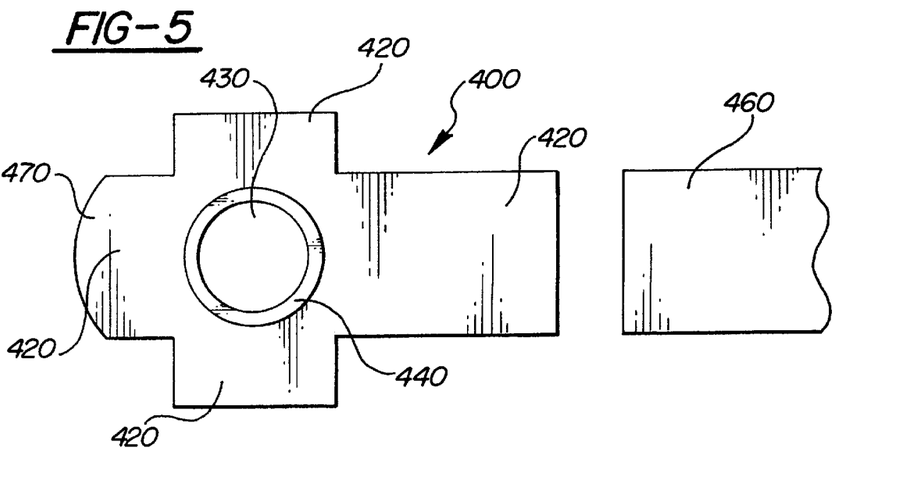
FIG. 5 is a top view of the structure of FIG. 4.

FIGS. 4 and 5 show another waveguide structure 400 that may be used to collect and distribute light from a light source 410. The structure 400 is a thin planar element in the shape of a cross that has four output arms 420 and an opening 430 in the center for accommodating a light source 410, although the number of arms may vary. The light source 410 may be enclosed in a cylindrical sleeve 440, which is inserted into the opening 430 in the waveguide structure 400. Light from the light source passes through the sleeve 440 into the structure 400, where it is divided into the output arms 420.

Figure 6:
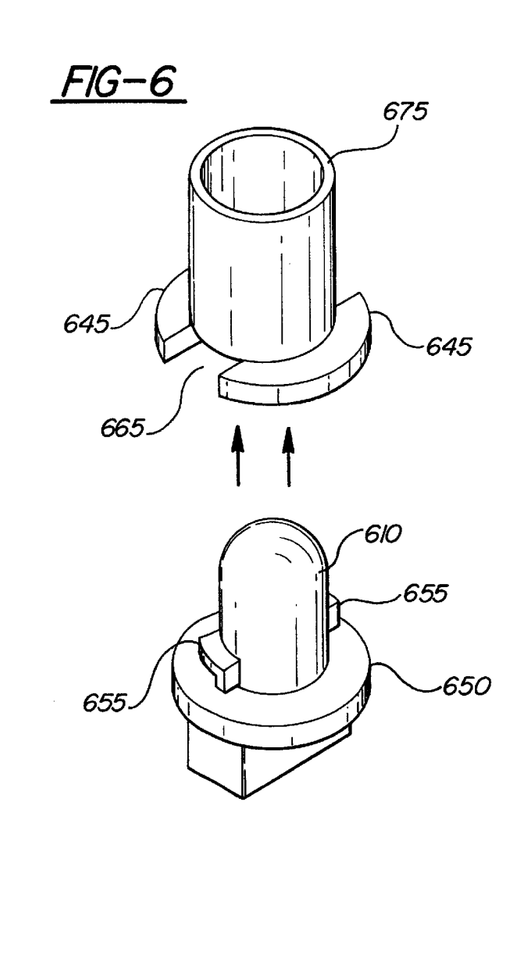
FIG. 6 is a perspective view of a waveguide sleeve for connection to a light source.
Figure 7:
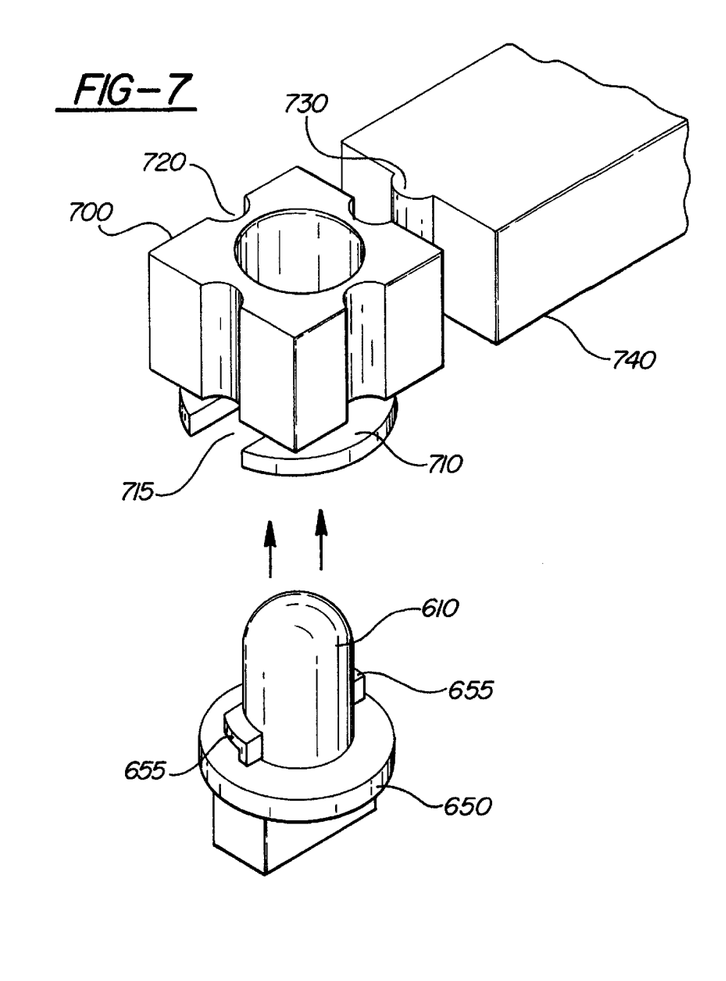
FIG. 7 is a perspective view of a waveguide structure having alignment notches.

As shown in FIG. 6, the cylindrical sleeve 640 may have a rim 645 for connection to the lamp base 650. The lamp base has locking tabs 655 which may be inserted into the gap 665 between the rim 645 portions of the sleeve 640. The lamp base is twisted so the locking tabs engage the rim 645 and hold the light source 610 in place within the sleeve 640. Alternatively, as shown in FIG. 7, a waveguide structure 700 may have an integrated rim 710 for connection to a lamp base 650. As above, the locking tabs 655 may be inserted into the gap 715 between rim 710 portions. The structure may have alignment notches 720 configured to accommodate alignment tabs 730 on the end of a connecting waveguide 740.

Figure 8:
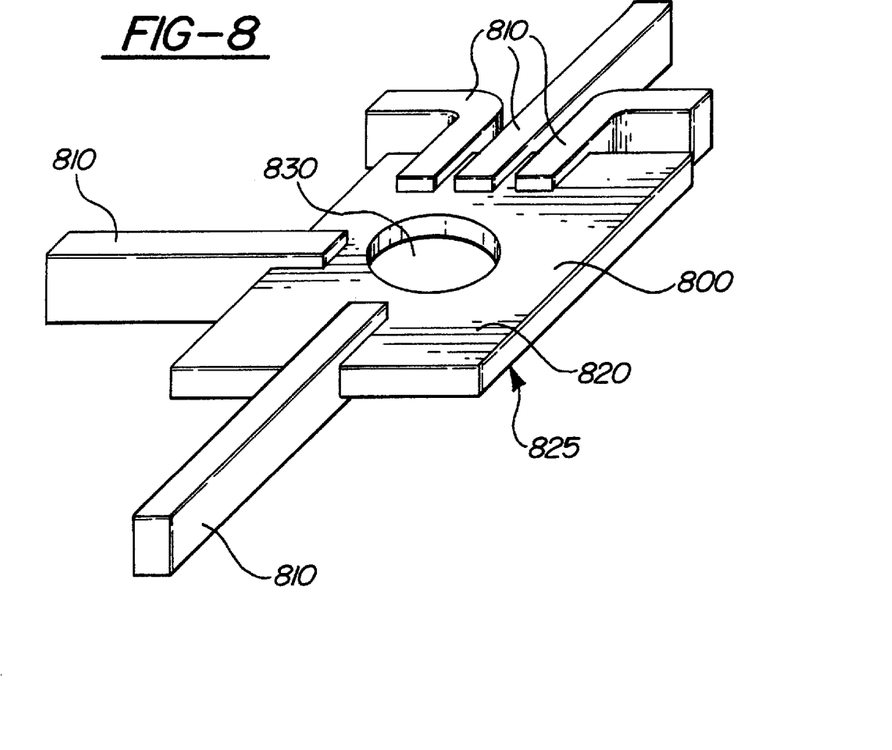
FIG. 8 is a perspective view of a waveguide structure having embedded waveguides.

FIG. 8 shows another waveguide structure 800 for collecting and distributing light from a light source. The structure 800 is a planar element that has embedded waveguides 810 that extend from top 820 and bottom 825 surfaces. The structure 800 surrounds and collects light from a light source (not shown) positioned in an opening 830. The structure 800 provides an efficient means for distributing the light collected from the light source. For example, the structure 800 may be mounted in the door panel or head liner of a vehicle. The waveguides 810 may carry light to various light output points on the door panel or head liner for providing interior vehicle illumination.

The structure 800 may be formed integrally with the waveguides 810 and may, for example, be formed of plastic or acrylic using injection molding. The waveguides 810 may be embedded in the waveguide structure 800, as shown in FIG. 8, or may be raised, i.e., extending from the top surface 820, as discussed below with reference to FIG. 10.

Figure 9:
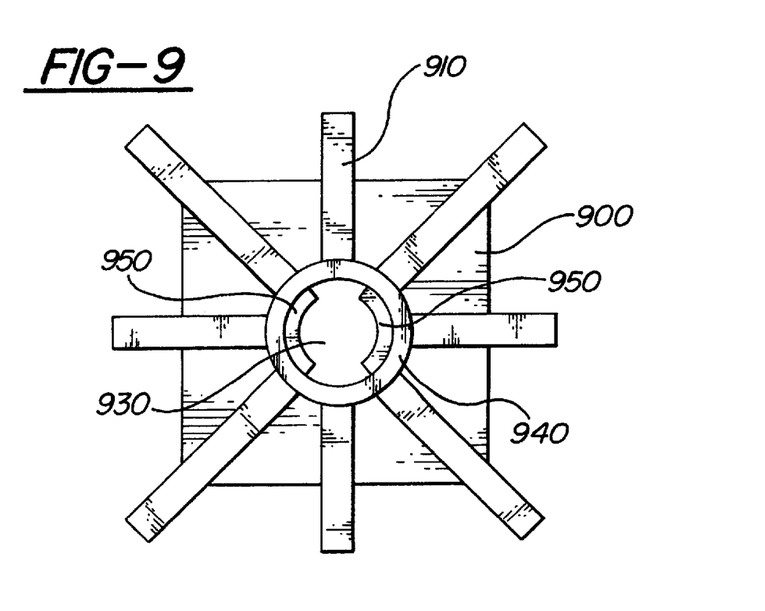
FIG. 9 is a top view of a waveguide structure having embedded waveguides and a cylindrical sleeve.

A similar structure 900, shown in FIG. 9, has waveguides 910 that are positioned radially with respect to the light source opening 930. The waveguides may be raised or embedded. A cylindrical sleeve 940 may surround the light source, as described above with reference to FIGS. 4–6. In addition, tabs 950 may extend into the opening 930. The tabs 950 are configured to mate with locking tabs of a light source to hold the light source in position in the opening 930.

Figure 10:
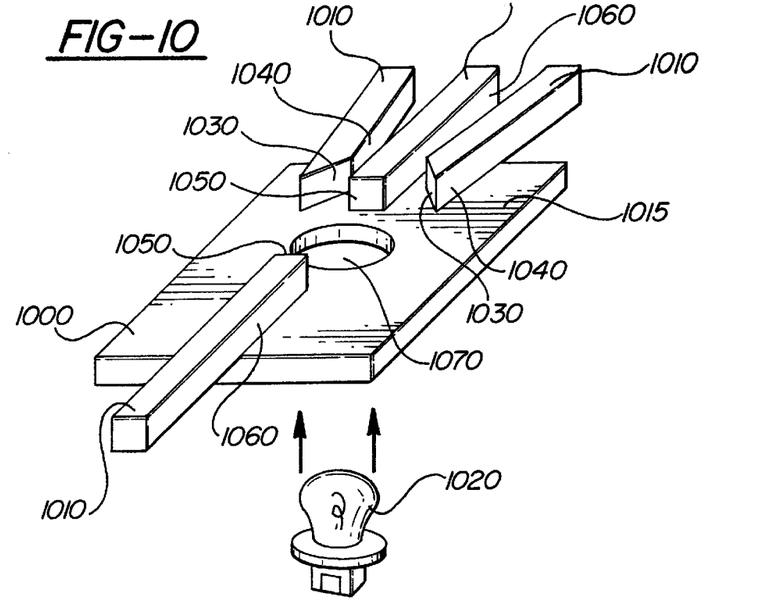
FIG. 10 is a perspective view of a waveguide structure having raised waveguides with angled input faces.

FIG. 10 shows another similar waveguide structure 1000 in which waveguides 1010 are mounted on a top surface 1015 and extend radially from the light source 1020. The input faces 1030 of some of the waveguides are angled with respect to the sides 1040 of the waveguides, i.e., the input faces 1030 form a non-orthogonal angle with respect to the sides 1040 of the waveguide. The input faces 1050 of other waveguides are orthogonal to the sides 1060 of the waveguide. The light source 1020 is inserted into an opening 1070 in the structure 1000.

Figure 11:
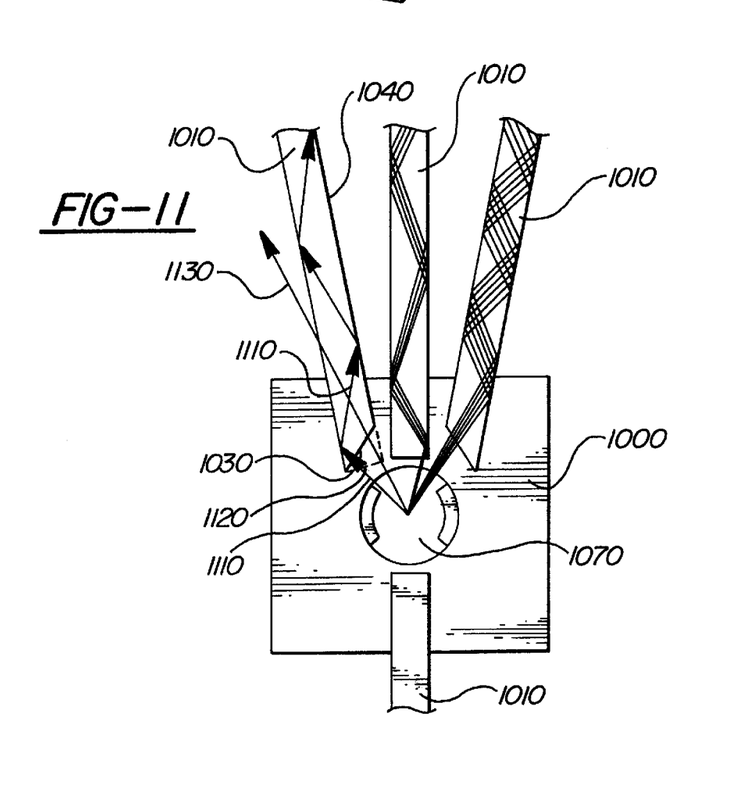
FIG. 11 is a light ray diagram for the waveguide structure of FIG. 10.

FIG. 11 shows a partial light ray diagram for the structure 1000. A light ray 1110 enters the face 1030 of the waveguide 1010. As discussed above, the face 1030 forms a non-orthogonal angle with respect to the side 1040 of the waveguide 1010. If the input face 1030 were not angled, as indicated by the dashed lines 1120, a light ray 1130 could enter the side 1040 of the waveguide and pass through the opposite side of the waveguide instead of being internally reflected. Hence, this configuration helps reduce the amount of light entering the side 1040 of the waveguide rather than the input face 1030. It also allows the waveguides 1010 to be positioned closer together, which prevents light from passing through gaps between the waveguides.

Figure 12:
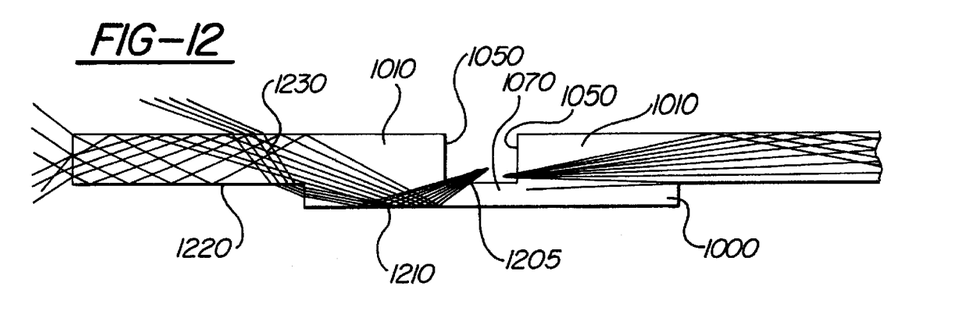
FIG. 12 is a side light ray diagram for the waveguide structure of FIG. 10.

FIG. 12 shows a side light ray diagram for the waveguide structure 1000. Some of the light from the light source, which is positioned in the opening 1070 in the structure 1000, directly enters the input face 1050 of the waveguide 1010. A portion 1205 of the light from the light source may be reflected from the bottom surface 1210 of the structure and may enter the waveguide 1010 through a bottom 1220 or side surface 1230.

Figure 13:
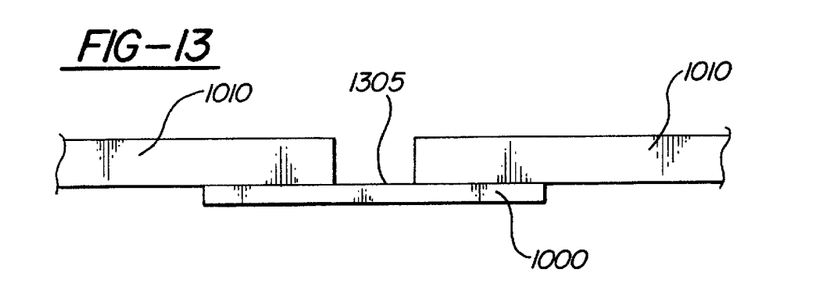
FIG. 13 is a side view of raised waveguides mounted on a top surface of a waveguide structure.
Figure 14:
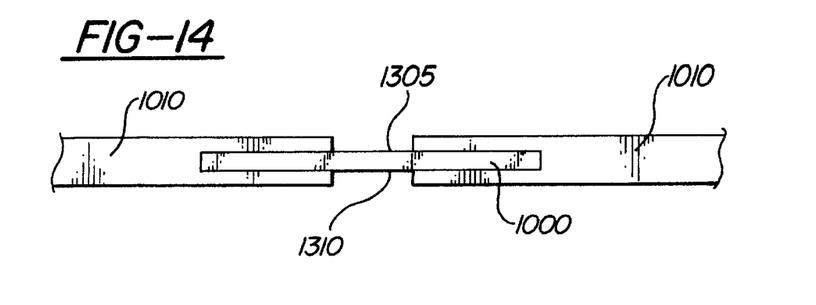
FIG. 14 is a side view of embedded waveguides extending from the top and bottom surfaces of a waveguide structure.

As shown in FIG. 13, the waveguides may be attached to the top surface 1305 of the structure 1000 by adhesive or by installation elements integrated into the structure and waveguides, such as snaps (not shown). Alternatively, the waveguides 1010 and structure 1000 may be formed from a solid piece of material, for example, injection-molded plastic or acrylic. As shown in FIG. 14, the waveguides 1010 may extend from the top 1305 and bottom 1310 surfaces of the structure 1000 rather than only from the top 1305 surface. The waveguides 1010 may be integrally formed with the structure 1000 from a solid piece of material, or the waveguides 1010 may be fastened to the structure 1000 with snaps or adhesive.

Figure 15:
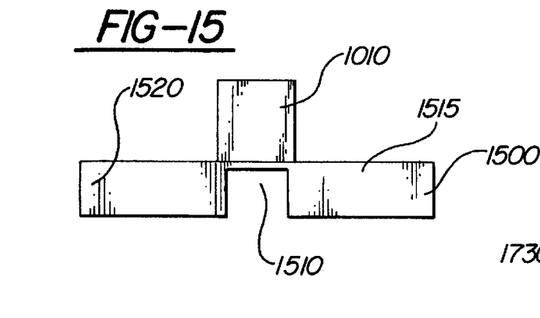
FIG. 15 is an end view showing a channel beneath a waveguide mounted on the top surface of a waveguide structure.
Figure 16:
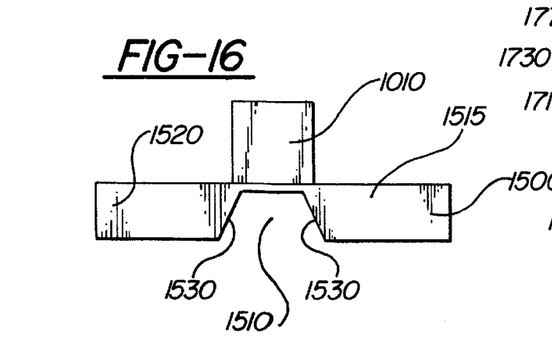
FIG. 16 is an end view showing a channel with inclined sides beneath a waveguide mounted on the top surface of a waveguide structure.

FIGS. 15 and 16 show end views of a waveguide mounted on a planar waveguide structure 1500. In FIG. 15, a channel 1510 is formed beneath the waveguide 1010 along the length of the waveguide 1010. The channel 1510 increases the isolation between the waveguide 1010 and the structure 1500 to reduce light loss from the waveguide 1010 and increase efficiency. The channel 1510 may be narrower than the waveguide 1010 and the depth of the channel 1510 may be less than the thickness of the structure 1500 in order to maintain structural support between sections 1515 and 1520 of the structure on either side of the waveguide 1010. As shown in FIG. 16, the sides 1530 of the channel 1510 may be inclined (i.e., the width of the channel increases in a direction away from the waveguide) to improve structural integrity.

Figure 17:
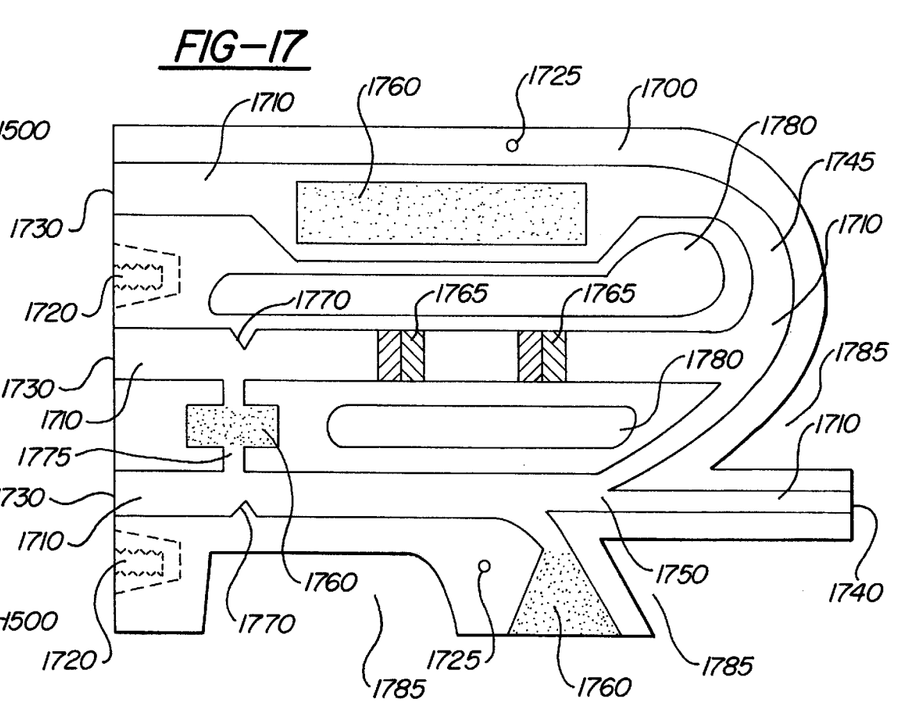
FIG. 17 is a top view of a lighting system having raised waveguides.

FIG. 17 shows a lighting system incorporating waveguides 1710 that are mounted on a planar waveguide structure 1700 (in a manner similar to FIG. 13) or embedded in the structure 1700 (in a manner similar to FIG. 14). The structure 1700 and waveguides 1710 may be formed from a single piece of material, such as acrylic, and may be injection molded. The structure may be mounted using screws that insert into screw cavities 1720 formed in the side of the structure 1700. The structure also may be mounted using screw holes 1725 that are orthogonal to the plane of the structure 1700.

The waveguide structure 1700 provides several advantages. For example, the structure 1700 generally has low manufacturing and material costs and is easy to install. The structure 1700 may be screwed or snapped into position in a vehicle dashboard or other location. In addition, the structure 1700 allows light to leak from a waveguide to an adjacent waveguide, if desired, in order to provide redundancy.

The waveguides 1710 have input faces 1730 positioned along a side of the structure. A waveguide output port 1740 is positioned on the opposite side of the structure. The input faces 1730 may receive light from outputs of an adjacent lighting system. The waveguides 1710 have bends 1745 and branches 1750 to carry light to desired locations on the structure 1700.

The top surface of the waveguides may be roughened, for example by sand blasting or bead blasting, to form light output surfaces 1760. Roughened surfaces also may be formed using a mold with rough or stippled surfaces. The surfaces 1760 direct light in the direction orthogonal to the plane of the structure 1700. The light output surfaces 1760 may be used, for example, to provide indicator lights or back lighting for a dashboard. Alternatively, notches 1765 may be formed in the top surface of the waveguides to release light. Notches 1770 also may be formed in the sides of the waveguides to direct light into branch structures 1775, such as a light output surface positioned between two waveguides.

Voids 1780 are formed in the structure 1700 between the waveguides 1710 in order to reduce weight and material costs. Similarly, gaps 1785 may be formed around the perimeter of the structure 1700.

In addition, as shown in FIGS. 15 and 16, channels may be formed beneath the waveguides to increase efficiency and to increase isolation between adjacent waveguides. The channels are particularly useful for instances in which high isolation between waveguides is desired. For example, the lighting system may include lighting functions that are not meant to be activated simultaneously.

Other embodiments are within the scope of the following claims.

What is claimed is:

1. An optical waveguide structure configured to receive light from a light source and distribute the light to output ports, characterized in that substructure comprises:
   a central waveguide portion having top and bottom surfaces, peripheral edges and an opening for receiving the light source, and
   a first waveguide extending from one of said top and said bottom surfaces of said central portion, said first waveguide having an input face at an end nearest said opening, and said first waveguide extending from said opening toward a peripheral edge of said central portion, said first waveguide receiving light transmitted from said central waveguide portion.

2. The optical waveguide structure of claim 1, wherein said first waveguide and said central waveguide portion are integrally formed as a single piece of material.

3. The optical waveguide structure of claim 1, wherein said input face of said first waveguide is orthogonal to a side of said first waveguide.

4. The optical waveguide structure of claim 5, wherein said input face of said first waveguide forms a non-orthogonal angle with respect to a side of said second waveguide.

5. The optical waveguide structure of claim 1, further comprising a second waveguide extending from one of said top and said bottom surfaces of said central portion, said second waveguide having an input face at an end nearest said opening, and said second waveguide extending from said opening toward a peripheral edge of said central portion.

6. The optical waveguide structure of claim 1, further comprising tabs positioned in an interior portion of said opening, the tabs being configured to attach the light source to said waveguide structure.

7. The optical waveguide structure of claim 1, further comprising a channel formed in said bottom surface beneath said first waveguide.

8. The optical waveguide structure of claim 7, wherein a width of said channel is narrower than a width of said first waveguide.

9. The optical waveguide structure of claim 7, wherein a width of said channel expands in a direction from the top surface to the bottom surface.

10. The optical waveguide structure of claim 7, wherein a depth of said channel is less than a thickness of said central waveguide portion.

11. The optical waveguide structure of claim 1 wherein said first waveguide extends from both of said top and said bottom surfaces.

12. The optical waveguide structure of claim 11, wherein said first waveguide and said central portion are integrally formed as a single piece of material.

13. The optical waveguide structure of claim 11, wherein said input face of said first waveguide is orthogonal to a side of said first waveguide.

14. The optical waveguide structure of claim 15, wherein said input face of said first waveguide forms a non-orthogonal angle with respect to a side of said second waveguide.

15. The optical waveguide structure of claim 11, further comprising of a second waveguide extending from both of said top and said bottom surfaces of said central portion, such second waveguide having an input face at an end nearest said opening, and said second waveguide extending from said opening towards said peripheral edges of said central portion.

16. The optical waveguide structure of claim 11, further comprising tabs positioned in an interior portion of said opening, the tabs being configured to attach the light source to said waveguide structure.

17. A lighting assembly comprising:
   a light source,
   a waveguide support structure made of an optically transmissive material having a top and a bottom surface,
   said light source extending above said top surface; and
   an integral optical waveguide on the top surface, receiving light directly from the light source, and receiving light reflected from the waveguide support structure, the optical waveguide being made of a solid material.

18. The optical waveguide structure of claim 17, further comprising a channel formed in said bottom surface beneath said optical waveguide.

19. The optical waveguide structure of claim 18, wherein a width of said channel is narrower than a width of said optical waveguide.

20. The optical waveguide structure of claim 18, wherein a depth of said channel is less than a thickness of said central portion.

21. The lighting component of claim 17, wherein the optical waveguide comprises an upper surface that is roughened to output light.

22. The lighting component of claim 17, wherein the optical waveguide comprises a notch formed in an upper surface of the optical waveguide to output light.

23. The lighting component of claim 17, wherein the optical waveguide comprises a branch portion that connects a first section of the waveguide to a second section of the waveguide, the branch having an upper surface that is roughened to output light.

24. The lighting component of claim 23, wherein the first section of the optical waveguide comprises a notch formed in a side surface of the waveguide to reflect light into the branch portion.

* * * * *